United States Patent [19]
Six

[11] Patent Number: 4,866,524
[45] Date of Patent: Sep. 12, 1989

[54] TELEVISION PICTURE OVERLAY MANAGEMENT DEVICE

[75] Inventor: Jean-Claude G. Six, Versailles, France

[73] Assignee: U. S. Philips Corporation, New York, N.Y.

[21] Appl. No.: 146,527

[22] Filed: Jan. 21, 1988

[30] Foreign Application Priority Data

Jan. 27, 1987 [FR] France .............. 8700917

[51] Int. Cl.[4] .............. H04N 5/272
[52] U.S. Cl. .............. 358/183; 340/734
[58] Field of Search .............. 358/183, 182, 185, 22; 340/734, 725

[56] References Cited

U.S. PATENT DOCUMENTS

| | | | |
|---|---|---|---|
| 3,674,930 | 7/1972 | Monett | 358/183 |
| 3,833,760 | 9/1974 | Tickle | 358/183 |
| 3,906,197 | 9/1975 | Grover | 340/734 X |
| 3,911,419 | 10/1975 | Bates et al. | 358/183 X |
| 4,208,675 | 6/1980 | Bajon et al. | 358/183 X |
| 4,354,184 | 10/1982 | Woborschil | 340/725 X |
| 4,354,185 | 10/1982 | Worborschil | 340/725 X |
| 4,477,830 | 10/1984 | Lindman et al. | 358/183 X |
| 4,639,765 | 1/1987 | D'Hont | 358/22 X |
| 4,689,616 | 8/1987 | Goude et al. | 340/725 |
| 4,768,083 | 8/1988 | Romesburg | 358/183 X |
| 4,768,095 | 8/1988 | Wada et al. | 358/183 |

*Primary Examiner*—James J. Groody
*Assistant Examiner*—E. Anne Faris
*Attorney, Agent, or Firm*—Marianne R. Rich

[57] ABSTRACT

In a system in which there are available several pictures the device according to the invention enables the management of the overlays of pictures by implementing a mechanism according to which transition points are defined during the scanning. At these transition points, the mode of display changes. The horizontal position of these points and the nature of the display change are contained in a special register (13). An abscissa comparator (12) continuously compares the current abscissa and the abscissa indicated in the register (13) and, after an abscissa identity has been found and a new overlay mode has been set up, the next word in the register (13) is taken into account. Means (5, 8) enable the content of the register (13) to be reloaded during the line scan return periods.

12 Claims, 2 Drawing Sheets

TELEVISION PICTURE OVERLAY MANAGEMENT DEVICE

The invention relates to a digital picture synthesizer device intended particularly for managing the overlays of several picture planes described line by line according to a television type scanning system, associated with a microprocessor and with at least one picture generator which generates at least one picture in real time from a pixel memory, this device in particular including a controller for governing the overlay of a television picture by a picture plane or of a picture plane by another picture plane.

Such a device is used in particular in domestic computer video processors, multi-picture cathode ray tube controllers or video processors for interactive audiodigital disks, known as CD-I.

The object of the invention is to provide additional means for managing the overlay of one picture by another. Means of doing this are known from the teletext system called "Antiope". In this system a matrix of characters which is digitally transmitted can be superimposed on a television picture. In order to do this, this matrix is scanned in synchronism with the television scanning by an abscissa counter which succesively points to the characters in a character memory, where one of the character description bits determines if this character is transparent or not. Depending on this bit, the television picture is displayed or, on the contrary, replaced by the description of the character during the duration of this character. This system enables the insertion of parts of pictures (Antiope characters) generated by the device in a picture (television picture) which is not generated by the device. The format of the superimposed characters is fixed once and for all.

When the two pictures to be processed are both generated by the device, another means is revealed by French patent application No. FR-A- 2,569,020. According to this document, the objects to be represented are loaded into memories each corresponding to an order of priority, and a map of the pixels of the picture is generated in a picture memory. In order to do this, it is checked whether or not for each pixel position, there is an object in the maximum priority memory, if so it is displayed, otherwise, the memory with the next highest priority is searched, and so on. It is also appropriate, during the filling of the picture memory with an object, to check, for each pixel, if it does not correspond to the start of another object in a memory of higher priority, in which case the content of this latter memory will be read starting from this pixel.

In this system, it is necessary to prepare the picture memory in advance. The process of its modification is too long to allow its content to be corrected between one scanning line and the next, and the image is modified, in order to create moving objects, during the frame scan return periods.

The device according to the invention enables the priorities of the various pictures to be varied during a line and the priorities to be modified during the return time between one line and the next, as very few data are sufficient in order to obtain this effect.

The device according to the invention is particularly remarkable in that it includes a register called the regions register containing a word series including in particular an abscissa value, means for reloading this register from the picture generator during the scan return periods, a current abscissa counter of the displayed pixels, a pointer counter for the words in the region register, an abscissa value comparator for comparing the content of the current abscissa counter with the abscissa contained in the word pointed to in the region register by the word counter, and, when there is &identity, for producing a signal which triggers the setting up of one of at least two predetermined types of overlay of picture planes, and for incrementing the region register word counter.

In addition, the device advantageously includes a register called a type of overlay register, in which are defined at least two of the abovementioned predetermined types of overlay and this register is divided into several sections, one section being constituted by a first set of bits contained in the regions register, another section being constituted by a second set of control bits from the controller, the first set of bits being an operation code for causing the changing of a conditional bit, called the regions bit, to each state of which corresponds a type of overlay defined by the second set of bits.

Thanks to this arrangement, which associates an operation code with each of the abscissas, it is possible to produce, from each abscissa defined in the regions register, a different type of overlay. Because the regions register contains few data it can be rapidly reloaded, and the means of reloading the regions register are advantageously active during the line scan return periods.

For example, by changing the abscissas between one line and the next, it is possible to describe overlay windows of any shape. If on the other hand the register is kept unchanged, the lateral edges of the windows are vertical straight lines.

Also, it is possible that one of the types of picture plane overlay is an overlay by a series of pixels whose colour remains constant between two abscissa identity signals.

Such an overlay generates a domain of colours whose contour is determined by the abscissas indicated at each line in the regions register. Thus it is possible to create a new monochrome object in addition to the pictures generated from the pixel memories.

In the case in which the picture generator generates several pictures, or if there are several picture generators, it is possible to apply the device to the overlay of one of these two pictures by the other. The words of the regions register therefore advantageously include an indication of the picture concerned in order to allow the processing of two picture planes with the same regions register.

Instead of using a simple overlay of one picture section by another, more complex effects can be obtained if several pictures are available in the device when one of the types of picture overlay consists of a weighted mixture of the colours of two pictures, and the words of the regions register include a field for indicating a weighting value.

The following description, given with reference to the attached drawings, describing non-limiting examples, will give a better understanding of how the invention can be embodied.

Figure 1:
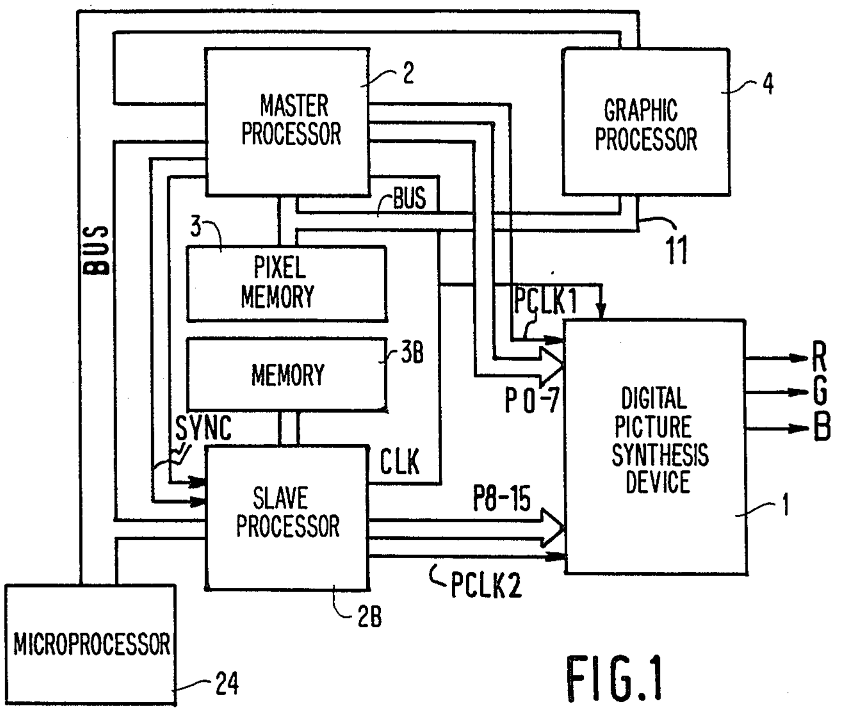
FIG. 1 is a block diagram showing an application of the device according to the invention.

In FIG. 1, the device according to the invention is indicated by the reference 1. It is used in association with a microprocessor 24 which is itself connected by its bus to a picture generator 2, 3, 4, which generates in real time, i.e. in synchronism with a television type successive line scanning, successive words each of which defines a pixel of the picture. This generator is here constituted by a master processor 2 which builds a picture from descriptive elements of objects stored in a pixel memory 3 to which it is connected by a bus 11, and by an identical slave processor 2B associated with a memory 3B. The master processor is also associated with a graphic processor 4 which is connected to the main bus and also to the bus 11 of the memory, and sub-processes certain repetitive operations in order to increase the power of the master processor. Such processors are described for example in the documents FR-A-No. 2,569,020 and EP-A-No. 0,145,046. The slave processor is only socalled because its clock and its synchronization are imposed on it by the master processor. It generates pictures whose content is independent of those of the master processor.

The device 1 generates the red, green and blue components of a composite picture, on three analog outputs RGB, which will be applied to a television receiver or a monitor fitted with video inputs for the three colours. The device processes several pictures in parallel and finally combines them by making overlays or additions with the values of the pixels, pixel by pixel. The device is controlled by control bytes passing through the pixel input gates during control sequences, during the scan return periods.

The two input flows can be processed in various ways in order to generate 1 to 3 pictures, depending on the chosen mode. The overlay of televison pictures is controlled by the device.

The master processor 2 supplies the device 1 with data bytes describing in particular the pixels of a picture via an 8-wire connection P0-7 and the necessary timing for reading these data is transmitted by a connection PCLK1. Similarly, the slave processor 2B supplies the data for another picture via the connections P8-15 and PCLK2.

Figure 2:
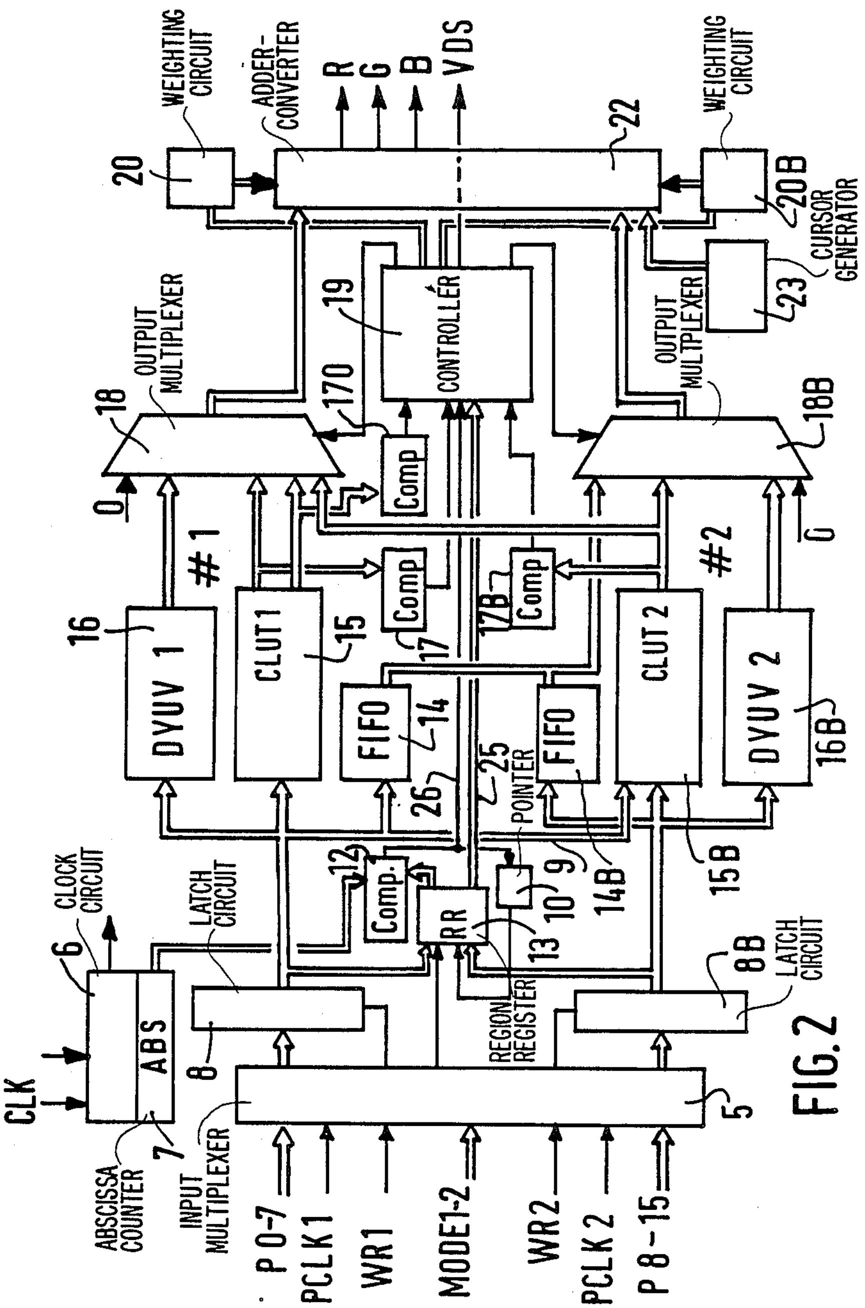
FIG. 2 is a block diagram of a device according to the invention.

FIG. 2 shows in greater detail the content of the device 1 of FIG. 1. It is divided into two approximately identical channels No 1 and No 2 each corresponding to at least one picture. The elements of channel No 2 which correspond with those of channel No 1 bear the same references with an additional index B.

The device includes on input a multiplexer 5 to which are taken the bytes of pixels at P0-7 and P8-15, and the clocks PCLK1 and PCLK2. In the simplest case, the bytes P0-7 are used by channel No 1 and the bytes P8-15 are used by channel No 2. It is also possible, however, to cross over the inputs. It is also possible to send 4 bits of P8-11 to channel No 1 where they are associated with 4 bits of P0-3 in order to constitute 8 bits. It is also possible to use all of the 16 bits for a single channel. Other combinations are also easy to imagine. A word applied to the MODE 1-2 input programs the multiplexer to choose one of these combinations.

The data coming from the multiplexer 5 pass through for each channel via a "latch" circuit 8, 8B which maintains the value of the bits until the next ones are validated.

The data are taken to the colour decoders 15, 16, 15B, 16B whose outputs are applied to output multiplexers 18, 18B governed by a controller 19 of the overlay of one picture by the other, and a MODE register. The latter is constituted and connected in a way that is known in data processing to most of the elements of the figure in order to set up the various operating modes which will be described later. It has not been shown in order not to complicate the figure. For the same reason, a few secondary interconnections have not been shown.

The outputs of the multiplexers 18, 18B are finally taken to an adder-converter 22 which digitally adds the pictures of two channels and then converts the digital data into red, green and blue analog values present on the connections R, G, B respectively which may be applied directly to the video stages of a televison receiver or of a colour monitor. It would be equally possible to firstly convert the pictures into analog values with several converters, and then to add these values in an analog way.

Two weighting circuits 20, 20B, also governed by the controller 19 each supply to the adder 22 a digital value called the weighting value by which the latter multiplies the colour amplitude data of each channel before adding them.

In the simplest case, these weighting values are 1/0 or 0/1 in order to respectively select the picture of channel No 1 or that of channel No 2. Other intermediate values, however, for example 0.5/0.5, provide at will a mix of the two pictures, for example in order to create a fadeover effect.

In addition, picture line synchronization signals CLK are supplied by the master processor of FIG. 1 to an internal clock circuit 6 which synchronizes the functions of the device.

The input data can define the colour of a pixel according to several processes:

In a first process, each pixel is defined by a set of 8 bits representing a colour code. This set of bits is therefore used to point to an address in a fast random access memory which supplies the colour values. Such a system, which is called a palette, and bears the label CLUT1 or CLUT2 (Colour Look Up Table is the English term), is referenced 15, 15B in FIG. 2.

In a variant, each byte of channel No 1 defines two pixels with 4 bits per pixel and the CLUT1 palette is divided under the control of the MODE register into two blocks each corresponding to 4 address bits which provides two pictures each of which can have 16 different colours. This variant can be used to provide two different pictures at the outputs of channel No 1.

Another process for defining the colour consists, as is done in television, in separately supplying the luminance, called "Y", and two colour differences called U and V. In addition, in order to reduce the quantity of data necessary, it is accepted to transmit the difference D between two successive pixels. The absolute value is given once at the start of each line in order to readjust the values in the case of an error during a line. This method is called DYUV. It requires only one byte per pixel, the data Y, U and V each being coded by four bits, and the data U and V each being transmitted on four bits, in alternate bytes only, in turn. A DYUV1 or DYUV2 decoder (reference 16, 16B) carries out the decoding in this process, which is used when natural pictures with delicate colours are being processed.

A third process used in the case of ordinary synthesis pictures, consists in directly coding the colours red, green and blue (RGB direct) at the input by means of 5 bits per colour, plus 1 transparency bit, which forms words of 16 bit. For economic reasons, the inputs B0-7 and B8-15 are used together and therefore only provide input capacity for one picture. (Both of the processors 2 and 2B of FIG. 1 work in parallel, each providing half of the bits). This single picture will of course be added to the external television picture.

In this case the colour code does not pass through a decoder since it corresponds directly to the necessary coding at the input of the output multiplexers. However, the decodings used in the other processes require some time. In order to ensure synchronism of the "RGB direct" pictures with the pictures obtained by the other processes, it is therefore necessary to delay them. For this purpose there are provided two "FIFO" (an abbreviation of the English term 'First In, First Out') shift registers referenced 14, 14B, whose outputs are joined in order to supply the single picture. In order to compensate these delays, in the case where the picture of the device is associated with a television picture, an external circuit of the type called PLL, slaved to the television synchronization, provides the device with a general synchronization which is in advance of that of the television.

The outputs of the various colour decoders are connected to the inputs of the multiplexer 18 or 18B which transmits one or other of the signals. In addition, an input labelled with a zero enables the picture of one channel to be permanently suppressed. Varied configurations can be programmed by loading the mode register. The latter groups bits defining the mode of channel No 1 and of channel No 2, and the data sources for each channel. The two data flows each of 8 bits in parallel can be combined or separate. Successive planes are defined as well as a background and a foreground. Channel No 1 is preferably used for defining the foreground picture and can be programmed to transmit the data in one of the following ways:

out of service
one picture from DYUV1,
one picture from the CLUT1 palette
two pictures from the CLUT1 palette
one picture from the CLUT2 palette Channel No 2 is preferably used for defining the background and can be programmed to transmit the data in one of the following ways:

out of service
one picture from DYUV2
one picture from the CLUT2 palette
one RGB direct picture, coming from the FIFO registers The CLUT1 decoder being able to supply two pictures, up to three pictures can therefore be shown for example on the screen of a television receiver by superimposition on the television picture. In addition a movable cursor in the foreground can be provided. It is generated by a generator 23 which supplies the adder 22 with a square of 16×16 pixels each defined by a single bit and which is always superimposed on any other picture when it is present. The generated pictures are therefore combined in order to define the final picture by the superimposition of up to five different planes which are:

the cursor plane
a first foreground plane (channel No 1)
a second foreground plane (channel No 1)
a background plane (channel No 2)
the plane of the television picture.

A first function of the device consists in defining what is the relative position of each intermediate plane.

A second function is to define transparent zones in the planes in order to allow the planes located behind them to be seen.

Figure 3:
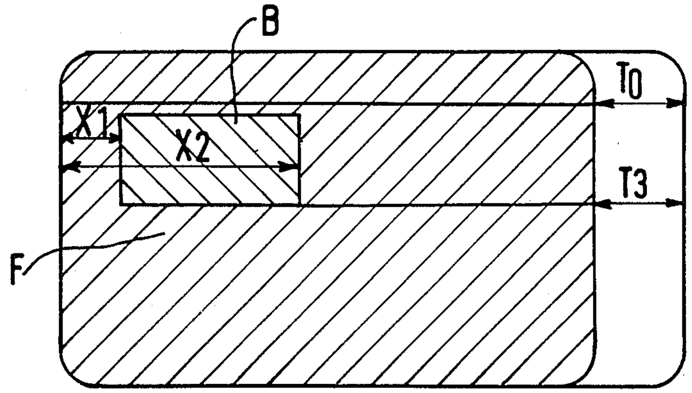
FIG. 3 is a diagrammatic representation of a video display screen with a window created by the device according to the invention.

This is done by the controller 19. FIG. 3 gives a very simple example with two planes. The front plane F is transparent in the area of a rectangle through which the back plane B appears.

Several processes can be used for creating such transparent windows. One of them has been mentioned above with respect to the RGB direct mode in which a particular bit defines the transparency.

In a more universal, related but more complicated to decode process, a particular colour has the significance: "transparent". It is a matter of a colour defined by its red, green and blue components. It is therefore at the output of the palette that it can be checked if this colour is present. This is the function of the three comparators 'Comp', referenced 17, 170 and 17B. These comparators check each pixel to see if the colour corresponds to a predetermined colour, in which case the pixel is transparent. The comparators then deliver a signal taken to the overlay controller 19 which programs the corresponding multiplexer 18, 18B so that it ceases to transmit the picture during the period in which the pixel in question is being displayed.

In the case where the plane or planes generated by the device are superimposed on a television picture, an output VDS of the overlay controller is connected to the adhoc pin of the peri-television socket of the television receiver in order to ensure the switching between the television picture and that (those) coming from the device.

In the case of the DYUV process the colour definition accuracy is insufficient to obtain a reliable comparison and the transparent colour process is not used.

The above description relates to the envircnment of the invention and its purpose is to enable a better understanding of the latter.

The transparency of the planes can also be controlled according to a coding mechanism of which the device implementing it is the main subject of the present invention. According to this mechanism, transition points are defined during each line of scanning and the display mode changes at these transition points. The horizontal position of these points, and the nature of the display change can also be defined during the scan return periods.

Figure 4:
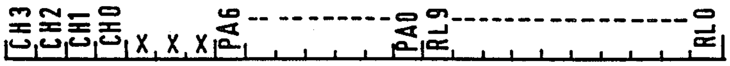
FIG. 4 shows the content of a word of the regions register.

In order to implement this mechanism, a region register 13 is used. It is so called because it enables regions in the picture to be defined. This register for example contains eight 24-bit words. One of these words is shown in FIG. 4. It contains 4 bits CH0-3 which represent an action to be carried out, 10 bits RL0-9 which represent an abscissa expressed as a number of pixels and 7 bits PA0-6 which are optional. Three bits X are unused. An abscissa counter 7 (FIG. 2) linked with the internal clock 6 enables it to be known at any time in the line what the number of the pixel being processed is. In addition, a counter 10 points to a word in the regions register. This counter is reset on each line return. A comparator 12 receives, on the one hand, the current abscissa from the counter 7 and, on the other hand, the abscissa written in the bits RL0-9 of the word pointed to in the regions register 13 by the counter-pointer 10. The bits CH0-3 of this word are also transmitted to the controller 19 by the connection 25.

The comparator 12 continuously compares the two abscissas and when these are identical, it delivers on the connection 26 a signal which is taken to the controller 19, which executes the action described by the bits CH0-3, and to the pointer 10 of the region register words in order to increment it. It is therefore a new abscissa which is henceforth compared by the comparator 12, with a new action to be carried out when there is identity of abscissas and so on until the last word, or until the end of the line. It would of course be possible, in a variant, to count the abscissas picture by picture instead of line by line, but this would uselessly increase the capacity necessary for the registers.

The overlay controller (19) includes in a register at least one so-called "region" bit. In the present example it includes two of them each of which is allocated to one of the channels. It would also be possible to allocate these bits to the pictures and to have three of them since three pictures can be available. In general terms, there can be as many of them as there are pictures to be processed. Among the various possible modes governed by the controller 19, one mode is chosen by programming, for example using a set of 4 bits per plane, called T bits, loaded by the master processor during a scan return time, and these four bits indicate the significance of the region bit. An example showing various possible programs is given in Table I which relates to four bits T10-13 contained in a register of the controller 19 and relating to the first foreground plane. There are of course two other groups of four bits each relating to one of the other planes.

The following abbreviations are used:

BR: the region bit

BT: bit No 16 indicating the transparency in direct RGB mode

CT: the bit delivered by the transparent colour comparators.

TABLE I

| Content of bits | | | | Condition for the |
|---|---|---|---|---|
| T13 | T12 | T11 | T10 | pixel to be transparent. |
| 0 | 0 | 0 | 0 | none: all of the pixels are transparent |
| 0 | 0 | 0 | 1 | CT is high |
| 0 | 0 | 1 | 0 | BT is high |
| 0 | 0 | 1 | 1 | BR No 1 is high |
| 0 | 1 | 0 | 0 | BR No 2 is high |
| 0 | 1 | 0 | 1 | BR No 1 or CT is high |
| 0 | 1 | 1 | 0 | BR No 2 is high |
| 1 | 0 | 0 | 0 | none: no transparent pixels |
| 1 | 0 | 0 | 1 | CT is low |
| 1 | 0 | 1 | 0 | BT is low |
| 1 | 0 | 1 | 1 | BR No 1 is low |
| 1 | 1 | 0 | 0 | BR No 2 is low |
| 1 | 1 | 0 | 1 | BR No 1 or CT is low |
| 1 | 1 | 1 | 0 | BR No 2 or CT is low |

It can be seen that with such a process, the possibilities are very wide since it is possible to consider or not consider each of the bits BR No1, BR No2, BT and CT which are available. In addition it is possible that two planes are not transparent together but with a weighting which provides a mix of the two pictures.

An example showing various actions controlled by tne bits CH0-3 of the word pointed to in the regions register is given in the following table II:

| Content of the 4 bits | | | | Action to be carried out |
|---|---|---|---|---|
| 0 | 0 | 0 | 0 | End of changes for the current line |
| 1 | 0 | 0 | 0 | Region bit set to zero |
| 1 | 0 | 0 | 1 | Region bit set to one |
| 0 | 1 | 0 | 0 | Change channel No 1 weighting |
| 0 | 1 | 1 | 0 | Change channel No 2 weighting |
| 1 | 1 | 0 | 0 | region bit set to zero + change channel No 1 weighting |
| 1 | 1 | 1 | 0 | Region bit set to zero + change channel No 2 weighting |
| 1 | 1 | 0 | 1 | Region bit set to one + change channel No 1 weighting |
| 1 | 1 | 1 | 1 | Region bit set to one + change channel No 2 weighting |

When an action relates to one of the region bits of the controller, which one is defined by one of the optional bits of the region register words (PA6).

When the action relates to a weighting, the new weighting is indicated by other optional bits (PA0-5). Thus all of the bits CH0-3 of the region word and of the bits T constitute a types of overlay register in which are defined at least two predetermined types of overlay of planes.

In a variant which is simplified to the maximum degree this register may not exist: it is therefore defined once and for all in the controller 19 that, for example if the regions bit is zero, the pixel concerned is transparent, and vice-versa.

In another intermediate variant, the action to be carried out can be defined directly by a group of bits in the words of the regions register. The types register is then completely contained within the regions register.

The maximum capabilities are of course offered by the preferred variant described above, combining the bits CH of the regions register and the bits T of the controller.

As channel No 1 is controlled by a single region bit, in the case in which the CLUT1 palette supplies two foreground pictures, the latter are allocated together. This does not prevent there being differences between the transparencies of these two foregrounds if interpretation conditions (table I) are provided for the region bit which are different for each of these two planes.

The 8 words of the regions register are in practice grouped 2×4, each of the groups of four being addressed to one channel. It is therefore possible to define two windows (that is 4 transitions) per plane. But because the operation code contains the channel to be allocated, each word can also be addressed to either of the channels indifferently. It is therefore possible for example to use the 8 words of the region register for the same channel, which enables 4 windows to be defined in it. In all cases, all of the transitions of all of the planes, i.e. the displayed picture, is equal to the number of regions (at least as regards the action of the region controller).

In the example shown in FIG. 3, a region concerning channel No 1 (foreground) is a rectangle in which there is transparency and outside of which there is for example the DYUV mode. At the abscissa X1 the transparent region is entered and the plane B corresponding to channel No 2 is visible. On arriving at abscissa X2 written in the second word of the region register, the region bit changes and the display of the plane F is resumed. It could be imagined, for example, that, in this rectangle, a second region bit concerning channel No 2, i.e. the background plane, defines in it a transparent circle through which the television picture would be seen. At the right of the figure there is indicated a zone which represents the line return periods. During these periods, it is possible to reload the regions register. As long as the words in the regions register are not changed, the same actions are repeated in each line, which generates drawings with rectangular outlines. Thus in order to create the rectangular window shown in FIG. 3, it is only necessary to carry out a first loading (two words) during the period To of the line prior to that where the start of the window occurs and a second loading (two words) during the period T3. Thus four words suffice to create such a window. In addition, by changing the content of the region register during each line return, it is possible to generate shapes with complex outlines. The corresponding words can be prepared in advance by the picture generator 2, 3, 4 and read at the opportune moment (for example To, T3). In particular, during the frame return periods, the software can update memory areas which are intended to subsequently be read during the line return periods, in order to obtain transitions which move from one picture to the next. It is thus possible to generate scanning effects or moving windows. The shape of the drawings, their movements and the transitions are entirely under the control of the software.

It is also possible to further imagine other uses of the regions: by increasing the number of interpretation conditions of the bits BR, BT, CT (which necessitates 5 bits instead of 4 in Table I) new possibilities become available such as for example "the pixel has a predetermined colour, whatever its colour code may be, if BR is high". Thus the device with the regions register enables a section of line to be covered by a series of pixels whose colour remains constant between two abscissa identity signals of the comparator 12, which creates additional monochrome objects of any shape whatsoever and possibly moving.

The data for reloading the region register 13 and possibly for reprogramming the controller 19 are entered into the device through the same inputs P0-7 and/or P8-15 as the pixels. These inputs are in fact unused during the scan return periods, since the pixels are transmitted in real time, i.e. during the forward periods of the scanning. The inputs WR1 and WR2 serve to indicate to the input multiplexer 5 that such data are being entered and no longer picture pixels.

During the line scan return periods it is possible to supply to the device 1 (at the same rate as that of the pixels during the forward periods) at least 64 bytes: it would therefore be possible to reload about twenty 24-bit words into the regions register. In practice the capabilities of the system are increased if the return periods are taken advantage of to also reload other registers. That is why the capacity of the regions register has voluntarily been limited to 8 words.

During the line return periods provision is also made for reloading:

- the mode register. This makes it possible for example to have at the top of the picture a section in delicate colours obtained via a DYUV decoder, and at the bottom a synthetic subtitling picture section obtained in direct RGB mode.
- the content of a palette. According to the capacity of the palette which depends on the chosen mode, it is possible to reload the entire palette or only a fraction of the palette. In all cases, this enables a same colour code to produce a colour which changes from the top to the bottom of the picture.

All which defines the cursor in the generator 23, i.e. a group of 32 bytes defining 16×16 pixels, a colour (4 bits) and coordinates X,Y. Thus it is possible to have several different cursors in the same picture.

The words coming from the processor 2 have 32 bits. They are entered into the system 1 in halves, i.e. 16 bits at a time at the inputs P0-7 and P8-15 together. In these words, four bits for example define the operation to be carried out, i.e. in general the register to which the information is being sent, and the other 28 bits represent the said information itself.

Provision is also mad for reloading registers in the processors 2, 2B of FIG. 1 during the line return periods. It is possible for example:

- to generate an interruption in the processor 24
- to reload the address at which the processor 2 or 2B reads a picture in the memory 3 or 3B, which enables the picture to be changed between two successive lines.
- to change semi-permanent data like the colour of the monochrome frame which possibly surrounds the picture.

The example given here with two channels, No 1 and No 2, can of course easily be extended to any number of channels, on the condition that several bits are provided instead of the single bit PA6, or even several regions registers.

What is claimed is:

1. Digital picture synthesizer device in a television apparatus that produces a television picture, said synthesizer device managing overlays of several picture planes described line by line according to a television type scanning system, associated with a microprocessor (24) and with at least one picture plane generator (2) which generates at least one picture plane in real time from a pixel memory (3), said picture plane generator including a controller (19) for governing the overlay of a television picture by a picture plane or of a picture plane by another picture plane, each television picture and each picture plane being composed at least in part of a plurality of display pixels displayed in scan lines on a display device with at least a scan return period between each scan line, characterized in that it includes a region register (13) containing a series of words, each word including an abscissa value (RL09), means (5, 8) for reloading the regions register from the picture generator during the scan return periods, a current abscissa counter (7) for containing an abscissa of currently displayed pixels, a pointer counter (10) for pointing to the abscissa value in the words in the regions register, an abscissa value comparator (12) for comparing the content of the current abscissa counter with the abscissa value contained in the word pointed to in the regions register pointed to by the pointer counter, and, when the content of the current abscissa counter equals the abscissa value, for providing the controller (19) with a signal to overlay at least one picture place onto a television picture or other picture plane, and for incrementing the pointer counter (10) so that it points to another abscissa value.

2. Device according to claim 1, characterized in that it includes register called a types of overlay register, in which are defined at least two predetermined types of picture planes and wherein the controller responds to the signal from the comparator to select one of said predetermined types of planes for overlay onto a television picture or another picture plane.

3. Device according to claim 2, characterized in that the types of overlay register includes a region bit (BR) and is divided into several sections, one section being constituted by a first set of bits (CH) contained in the regions register (13), another being constituted by a second set of control bits (T) from the controller (19), the first set of bits (CH) being an operation code for causing a change of state of the region bit (BR), to each state of which corresponds a type of overlay defined by the second set of bits (T).

4. Device according to claim 1, characterized in that the means of reloading the regions register are active during the line scan return periods.

5. Device according to claim 1, wherein the television picture and the picture planes include colour codes with at least one code associated with each pixel and characterized by a pixels input channel (P0-15), through which the colour codes of the successive pixels normally pass, and a demultiplexer (5) in the pixels input channel (P0-15) for enabling the colour codes present on the said input channel (P0-15) to be routed to the regions register (13) during at least part of the scan return periods.

6. Device according to claim 2, characterized in that one of the type of picture planes is an overlay by a series of pixels whose colour remains constant during a selected period after the content of the current abscissa counter equals the abscissa value in the regions register (13) pointed to by the pointer counter.

7. Device according to claim 1, whose picture plane generator generates several picture planes, characterized in that each word of the word series of the regions register includes an indication of which of the several picture planes is being generated (PA6) in order to allow the processing of two picture planes with the same regions register 8. Device according to claim 7, wherein at least one of the picture planes consists of a weighted mixture of colours of two picture planes, characterized in that the words of the regions register include a field for indicating a weighting value.

9. In a television receiver, an apparatus for controlling the display of a television picture and at least one picture overlay, each television picture and each picture overlay being composed at least in part of a plurality of display pixels displayed in scan lines on a display device with at least a scan return period between each scan line, said apparatus comprising:

- a picture overlay generator for generating at least one picture overlay;
- a regions register containing at least one word that includes a regions abscissa value indicating a predetermined position along a scan line on the display device;
- reloading means for selectively reloading said regions register with at least another word during the scan return periods;
- a current abscissa counter for counting pixels of each scan line as the scan lines are displayed on the display device and for storing a current abscissa value corresponding to the currently displayed pixel;
- comparator means for comparing the regions abscissa value with the current abscissa value and for generating a match signal when the two abscissa values are equal; and
- controller means for controlling the display of the television receiver to display at least the picture overlay in response to the match signal.

10. The apparatus of claim 9 wherein said regions register contains a plurality of words arranged in a word series with each word including an abscissa value and further comprising:

- a pointer for pointing to a selected abscissa value in said regions register, said comparator means comparing the selected abscissa value in the regions register with the current abscissa value and producing the match signal when the current abscissa value equals the selected abscissa value;
- incrementing means for incrementing said pointer to point to the next abscissa value in the next word of the word series in said regions register in response to the match signal; and
- said comparator means producing another match signal when the current abscissa value equals the next abscissa value pointer to by the pointer.

11. The apparatus of claim 9 wherein said regions register contains a plurality of words arranged in a word series with each word including an abscissa value and an action code and further comprising:

- a pointer for pointing to a selected abscissa value in said regions register;
- incrementing means for incrementing said pointer to point to the next abscissa value in the next word of the word series in said regions register in response to the match signal; and wherein:
- said comparator means compares the selected abscissa value pointed to by said pointer with the current abscissa value and produce the match signal each time the current abscissa value equals the abscissa value pointed to by the pointer, whereby the comparator means first produces the match signal when the current abscissa value equals the abscissa value of the first word in the word series and produces the match signal against each time the current abscissa value equals the next abscissa value of the next word in the word series; and
- said controller means is responsive to the match signal to display a picture overlay corresponding to the action code of the word pointed by the pointer when the match signal was produced.

12. The apparatus of claim 9 wherein:

- said picture overlay generator produces a plurality of different types of picture overlays;
- said regions register contains a plurality of words and each word includes a type code corresponding to one of the different types of picture overlays; and
- said comparator means responds to the match signal to produce a type of picture overlay that corresponds to a type code in a word.

* * * * *